US011903087B2

(12) United States Patent
Karaoguz et al.

(10) Patent No.: US 11,903,087 B2
(45) Date of Patent: *Feb. 13, 2024

(54) METHOD AND SYSTEM FOR A NETWORKED SELF-CONFIGURING COMMUNICATION DEVICE UTILIZING USER PREFERENCE INFORMATION

(71) Applicant: Avago Technologies International Sales Pte. Limited, Singapore (SG)

(72) Inventors: Jeyhan Karaoguz, Irvine, CA (US); Arya Behzad, Poway, CA (US); Mark Buer, Gilbert, AZ (US); Alexander G. MacInnis, Ann Arbor, MI (US); Thomas Quigley, Franklin, NC (US); John Walley, Ladera Ranch, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,779

(22) Filed: Feb. 1, 2021

(65) Prior Publication Data
US 2021/0321248 A1    Oct. 14, 2021

Related U.S. Application Data

(63) Continuation of application No. 16/834,723, filed on Mar. 30, 2020, now Pat. No. 10,911,938, which is a
(Continued)

(51) Int. Cl.
*H04W 4/60* (2018.01)
*H04W 92/18* (2009.01)
(Continued)

(52) U.S. Cl.
CPC ............ *H04W 8/18* (2013.01); *H04W 8/20* (2013.01); *H04W 8/205* (2013.01); *H04W 8/24* (2013.01); *H04W 8/245* (2013.01)

(58) Field of Classification Search
USPC .................................. 709/222, 205
See application file for complete search history.

(56) References Cited

U.S. PATENT DOCUMENTS

| 5,442,749 A | 8/1995 | Northcutt et al. |
| 5,548,324 A | 8/1996 | Downs et al. |

(Continued)

FOREIGN PATENT DOCUMENTS

| CN | 1859160 A | 11/2006 |
| EP | 0 905 939 | 3/1999 |

(Continued)

OTHER PUBLICATIONS

Seagate Technology LLC, Seagate D.A.V.E. (Digital Audio Video Expenence) Transform the consumer digital content experience with the Seagate D.A.V.E. design concept, Data Sheet, 2007.

(Continued)

*Primary Examiner* — Jude Jean Gilles
(74) *Attorney, Agent, or Firm* — Foley & Lardner LLP

(57) ABSTRACT

A first electronic device may enable generation, updating, and/or storage of user configuration information. The user configuration information may comprise information pertaining to device configuration and/or operational preferences specific to the device user and/or various use settings, connectivity, and/or use of available resources. The generation, updating, and/or storage of the user configuration information may be performed manually and/or automatically, and may be performed directly within the first electronic device and/or via networked devices, which may communicatively coupled to the first electronic device. A second electronic device may be enabled to be communicatively coupled to the first electronic device and/or the networked devices. The second electronic device may then be enabled to download existing user configuration information from the first electronic device and/or the networked device, and the downloaded user configuration may be utilized to configure the second electronic device.

50 Claims, 4 Drawing Sheets

Related U.S. Application Data continuation of application No. 15/916,808, filed on Mar. 9, 2018, now Pat. No. 10,609,547, which is a continuation of application No. 14/949,396, filed on Nov. 23, 2015, now Pat. No. 9,918,218, which is a continuation of application No. 12/138,249, filed on Jun. 12, 2008, now Pat. No. 9,198,030.

(60) Provisional application No. 60/943,484, filed on Jun. 12, 2007.

(51) Int. Cl.
*H04W 84/18* (2009.01)
*H04W 88/06* (2009.01)
*H04W 8/18* (2009.01)
*H04W 8/24* (2009.01)
*H04W 8/20* (2009.01)
*H04L 15/16* (2006.01)

(56) References Cited

U.S. PATENT DOCUMENTS

| | | |
|---|---|---|
| 5,848,415 A | 12/1998 | Guck |
| 5,905,524 A | 5/1999 | Sauer |
| 5,940,391 A | 8/1999 | Malkin et al. |
| 6,091,777 A | 7/2000 | Guetz et al. |
| 6,097,380 A | 8/2000 | Crites et al. |
| 6,128,668 A | 10/2000 | Barber et al. |
| 6,188,428 B1 | 2/2001 | Koz et al. |
| 6,233,017 B1 | 5/2001 | Chaddha |
| 6,359,902 B1 | 3/2002 | Putzolu |
| 6,374,260 B1 | 4/2002 | Hoffert et al. |
| 6,414,725 B1 | 7/2002 | Clarin et al. |
| 6,421,429 B1 | 7/2002 | Merritt et al. |
| 6,463,445 B1 | 10/2002 | Suzuki et al. |
| 6,470,378 B1 | 10/2002 | Tracton et al. |
| 6,480,541 B1 | 11/2002 | Girod et al. |
| 6,542,901 B1* | 4/2003 | Devine ............... G06F 16/258 707/999.005 |
| 6,546,002 B1* | 4/2003 | Kim ..................... H04L 9/40 370/351 |
| 6,553,413 B1 | 4/2003 | Lewin |
| 6,671,563 B1 | 12/2003 | Engelson et al. |
| 6,763,392 B1 | 7/2004 | Val et al. |
| 6,795,863 B1 | 9/2004 | Doty |
| 6,898,623 B1 | 5/2005 | Williams et al. |
| 6,947,922 B1 | 9/2005 | Glance |
| 6,977,934 B1 | 12/2005 | Dalby et al. |
| 7,020,532 B2 | 3/2006 | Johnson |
| 7,075,000 B2 | 7/2006 | Gang et al. |
| 7,102,067 B2 | 9/2006 | Gang et al. |
| 7,103,099 B1 | 9/2006 | Paz et al. |
| 7,103,906 B1 | 9/2006 | Katz et al. |
| 7,107,106 B2 | 9/2006 | Engleson et al. |
| 7,142,567 B1 | 11/2006 | Caracciolo et al. |
| 7,191,462 B1 | 3/2007 | Roman et al. |
| 7,234,158 B1 | 6/2007 | Guo et al. |
| 7,610,295 B2 | 10/2009 | Pooni |
| 7,647,346 B2 | 1/2010 | Silverman et al. |
| 7,721,104 B2 | 5/2010 | Salo et al. |
| 7,885,340 B2 | 2/2011 | Greenbaum et al. |
| 7,949,722 B1 | 5/2011 | Ullman et al. |
| 7,962,482 B2 | 6/2011 | Handman et al. |
| 7,965,825 B1 | 6/2011 | Herriman et al. |
| 7,996,514 B2 | 8/2011 | Baumert |
| 8,145,735 B2 | 3/2012 | Manchester et al. |
| 8,495,242 B2 | 7/2013 | Barger et al. |
| 8,767,931 B2 | 7/2014 | Perfetto |
| 8,924,309 B2* | 12/2014 | Hamid ................ H04L 63/0823 705/64 |
| 9,088,808 B1 | 7/2015 | He et al. |
| 9,198,030 B2* | 11/2015 | Karaoguz ............ H04W 8/245 |
| 9,525,595 B2 | 12/2016 | Chaudhari et al. |
| 9,918,218 B2* | 3/2018 | Karaoguz ............ H04W 8/245 |
| 10,079,869 B2 | 9/2018 | Ramaley et al. |
| 10,467,916 B2* | 11/2019 | Bishop .................. G09B 19/00 |
| 10,609,547 B2* | 3/2020 | Karaoguz ............ H04W 8/18 |
| 10,911,938 B2* | 2/2021 | Karaoguz ............ H04W 8/18 |
| 2001/0018693 A1 | 8/2001 | Jain et al. |
| 2002/0056008 A1 | 5/2002 | Keane |
| 2002/0091859 A1 | 7/2002 | Tuomenoksa |
| 2002/0138600 A1 | 9/2002 | Singhal |
| 2002/0143782 A1 | 10/2002 | Headings et al. |
| 2003/0005452 A1 | 1/2003 | Rodriguez |
| 2003/0017838 A1 | 1/2003 | Kayama et al. |
| 2003/0018755 A1 | 1/2003 | Masterson et al. |
| 2003/0061305 A1 | 3/2003 | Copley et al. |
| 2003/0131076 A1 | 7/2003 | Nelson et al. |
| 2003/0141093 A1 | 7/2003 | Tirosh et al. |
| 2003/0151513 A1* | 8/2003 | Herrmann ............ G08B 25/003 370/254 |
| 2003/0200278 A1* | 10/2003 | Youn .................. H04M 1/72406 709/227 |
| 2003/0206710 A1 | 11/2003 | Ferman et al. |
| 2004/0107366 A1* | 6/2004 | Balfanz ................ H04L 63/065 726/5 |
| 2004/0205772 A1 | 10/2004 | Uszok et al. |
| 2004/0243527 A1 | 12/2004 | Gross |
| 2004/0259533 A1* | 12/2004 | Nixon .................. H04W 40/24 455/414.3 |
| 2004/0266449 A1* | 12/2004 | Smetters .............. H04L 63/062 455/452.1 |
| 2005/0021694 A1 | 1/2005 | Yuan |
| 2005/0125669 A1* | 6/2005 | Stewart ................ H04L 63/061 713/171 |
| 2005/0203849 A1* | 9/2005 | Benson ................ G06Q 30/04 705/52 |
| 2006/0080702 A1* | 4/2006 | Diez ...................... A63F 13/71 725/31 |
| 2006/0173974 A1* | 8/2006 | Tang ...................... H04L 63/08 709/225 |
| 2006/0183490 A1 | 8/2006 | Madhavan et al. |
| 2006/0206478 A1 | 9/2006 | Glaser et al. |
| 2006/0259593 A2 | 11/2006 | Oliphant |
| 2006/0265508 A1* | 11/2006 | Angel .................. H04L 61/2567 709/230 |
| 2007/0004511 A1* | 1/2007 | Walker .................. G07F 17/323 463/30 |
| 2007/0088707 A1 | 4/2007 | Durgin |
| 2007/0100960 A1* | 5/2007 | Eichstaedt ............ H04L 67/101 709/217 |
| 2007/0127426 A1* | 6/2007 | Watters ................ H04L 67/125 370/465 |
| 2007/0271300 A1 | 11/2007 | Ramaswamy |
| 2008/0134292 A1 | 6/2008 | Ariel et al. |
| 2008/0301732 A1 | 12/2008 | Archer et al. |
| 2010/0112997 A1 | 5/2010 | Roundtree |
| 2010/0185729 A1 | 7/2010 | Lord et al. |
| 2010/0211636 A1 | 8/2010 | Starkenburg et al. |
| 2014/0280132 A1* | 9/2014 | Auger ................... G06F 9/543 707/736 |
| 2016/0371438 A1* | 12/2016 | Annulis ................ G06F 21/32 |
| 2017/0068533 A1* | 3/2017 | Kiaie .................... G06F 8/65 |

FOREIGN PATENT DOCUMENTS

| | | |
|---|---|---|
| JP | 2003-230125 A | 8/2003 |
| WO | WO-01/13277 A2 | 2/2001 |
| WO | WO-01/55879 A1 | 8/2001 |

OTHER PUBLICATIONS

Seagate Technology LLC, Seagate D.A.V.E. (Digital Audio Video Experience) The portable storage platform that collects, plays and manages digital content, Product Overview, 2007.

Fayyaz et al., "Recommendation Systems: Algorithms, Challenges, Metrics, and Business Opportunities." Appl. Sci. 2020, 10, 7748; doi:10.3390/app10217748.

(56) References Cited

OTHER PUBLICATIONS

Ho et al., "E-MRS: Emotion-based Movie Recommender System", Department of Informatics and Operations Research University of Montreal, Quebec, Canada.
Icoglu et al., "User Preference Matching for Smart Browsing of Media Contents", Downloaded From: https://www.spiedigitallibrary.org/conference-proceedings-of-spie on Mar. 26, 2021.
IPR2021-01298: Amazon.com—Ben-Hur.
IPR2021-01298: Amazon.com—Gone with the Wind.
IPR2021-01298: Amazon.com—The Lord of the Rings: The Return of the King.
IPR2021-01298: Decision Granting Institution of Inter Partes Review 35 U.S.C. 314.
IPR2021-01298: Declaration #2 of Stephen Gray (Previously filed In IPR2021-01334).
IPR2021-01298: Declaration #3 of Stephen Gray (Previously filed in IPR2021-01335).
IPR2021-01298: Declaration of Ghassan Alregib.
IPR2021-01298: Declaration of Gordon Macpherson.
IPR2021-01298: Deposition of Dr. Ghassan Alregib vol. I—Monday, Jun. 27, 2022.
IPR2021-01298: Deposition of Dr. Ghassan Alregib vol. II—Tuesday, Jun. 28, 2022.
IPR2021-01298: Exhibit E-Infringement Contention Chart for U.S. Pat. No. 10,911,938 (the "Karaoguz '938 Patent").
IPR2021-01298: Fandom.com—Lord of the Rings Extended Edition.
IPR2021-01298: Filmsite.org—Gone with the Wind.
IPR2021-01298: IEEE—Declaration of Gordon Macpherson.
IPR2021-01298: Invalidity exhibits 938-7 and 938-11.
IPR2021-01298: Invalidity exhibits 938-7 and 938-5.
IPR2021-01298: Memorandum Opinion and Order.
IPR2021-01298: Newton's Telecom Dictionary.
IPR2021-01298: Order Conduct of Proceeding 37 C.F.R. 42.5.
IPR2021-01298: Patent Owner's Mandatory Notices Under 37 C.F.R. 42.8 And Notice of Lead and Backup Counsel.
IPR2021-01298: Patent Owner's Preliminary Response.
IPR2021-01298: Patent Owner's Response.
IPR2021-01298: Patent Owner's Responsive Chart To Petitioner's Chart Identifying New Arguments.
IPR2021-01298: Patent Owner's Sur-Reply.
IPR2021-01298: Patent Owner's Sur-Reply in Support of Preliminary Response.
IPR2021-01298: Patent Owner's Updated Exhibit List.
IPR2021-01298: Patent Owner's Updated Mandatory Notices Under 37C.F.R. 42.8.
IPR2021-01298: Petition #2 For Inter Partes Review of U.S. Pat. No. 10,911,938.
IPR2021-01298: Petition #3 For Inter Partes Review of U.S. Pat. No. 10,911,938.
IPR2021-01298: Petition for Inter Partes Review of U.S. Pat. No. 10,911,938.
IPR2021-01298: Petitioner's Chart Identifying New Arguments.
IPR2021-01298: Petitioner's Objections To Patent Owner's Evidence Pursuant To 37 C.F.R. 42.64(b)(1).
IPR2021-01298: Petitioner's Reply.
IPR2021-01298: Petitioner's Reply To Patent Owner's Preliminary Response.
IPR2021-01298: Petitioner's Updated Exhibit List—Dec. 7, 2021.
IPR2021-01298: Petitioner's Updated Exhibit List—Mar. 10, 2022.
IPR2021-01298: Plaintiffs' Patent Rule 3-1 and 3-2 Disclosures To Netflix.
IPR2021-01298: Reply Declaration of Stephen Gray.
IPR2021-01298: Secrets of Home Theater and High Fidelity Movie Collector's Guide.
IPR2021-01298: Statement Regarding Multiple Petitions.
IPR2021-01298: Transcript of Stephen Gray—Conducted on Apr. 14, 2022.
IPR2021-01298: Transcript of Stephen Gray, vol. II—Conducted on Apr. 15, 2022.
IPR2021-01298: Wayback Machine—YouTube—Dec. 1, 2005.
IPR2021-01298: Wayback Machine—YouTube—My Channels Dec. 1, 2005.
IPR2021-01298: Webster's New College Dictionary.
IPR2021-01298: Wikipedia.org Firefly(website).
IPR2021-01298: Wiley Electrical and Electronics Engineering Dictionary.
Kahmann et al., "Collaborative Streaming and Dynamic Scenarios", Communications of the ACM Nov. 2006/vol. 49, No. 11.
Lee et al., "Development of Seamless Data Streaming System Based on User Preference and Device Information", Proceedings of the Fourth International Conference on Software Engineering Research, Management and Applications (SERA'06).
Li et at., "Collaborative filtering on streaming data with interest-drifting", Intelligent Data Analysis 11 (2007) 75-87 IOS Press.
Min et al., "Design of an Adaptive Streaming System in Ubiquitous Environment", Downloaded on Mar. 26, 2021 at 19:40:08 UTC from IEEE Xplore.
Smith et al., "Transcoding Internet Content for Heterogeneous Client Devices" 0-7803-4455-3/98/$10.00, 1998 IEEE.
U.S. Appl. No. 60/147,815, filed Aug. 10, 1999, Tom Doty.
"Microsoft DirectX and Windows Media Technologies on Windows CE". Gamesurge. Jun. 1999.
Adomavicius, G., & Tuzhilin, A. "Toward the next generation of recommender systems: A survey of the state-of-the-art and possible extensions." IEEE transactions on knowledge and data engineering, 17(6), 734-749. Apr. 25, 2005.
Amatriain & Basilico, "Netflix Recommendations: Beyond the 5 stars (Part 1)". Netflix Technology Blog. Apr. 6, 2012.
Arrington, Michael. "Pandora Goes Mobile, and Sonos, and More" TechCrunch. May 22, 2007. 9 pages.
Bartolini, et al. "A walk through content delivery networks." Performance Tools and Applications to Networked Systems: Revised Tutorial Lectures. Springer Berlin Heidelberg, pp. 1-25. 2004.
Bernhardt & Biersack. "The server array: A scalable video server architecture." High-Speed Networking for Multimedia Applications. pp. 103-125. Mar. 1996.
Carter et al., "Server Selection using Dynamic Path Characterization in Wide-Area Networks", In Proceedings of IEEE Infocom '97, Apr. 1997. Dec. 5, 1996.
Chaddha, Navin. "A software only scalable video delivery system for multimedia applications over heterogeneous networks." Proceedings., International Conference on Image Processing. vol. 3. IEEE, Oct. 23, 1995.
Cheung, et al. "On the use of destination set grouping to improve fairness in multicast video distribution." Tech Report GIT-CC-95-25. Jul. 18, 1995.
Cinematch PRM. Netflix. Feb. 6, 2006. 12 pages.
De Cuetos, et al., "Adaptive streaming of stored video in a TCP-friendly context: Multiple versions or multiple layers." Proc. of International Packet Video Workshop (PV'01). Apr. 2001.
De Keukelaere, et al. "MPEG-21 Session Mobility on Mobile Devices." International Conference on Internet Computing. vol. 287293. Jun. 2005.
Defendant's Disclosure of Invalidity Contentions, *CA, Inc. and Avago Technologies international Sales PTE. Limited* v. *Netflix, Inc.*, Case 2:22-cv-00080-JRG-RSP (E.D. Tex.) signed Aug. 26, 2021. 107 pages.
Dilley, et al. "Globally distributed content delivery." IEEE Internet Computing 6(5):50-58. Nov. 7, 2002.
Elsen, et al. "Streaming technology in 3G mobile communication systems." Computer 34(9): 46-52. Sep. 2001.
Greene, Kate. "The $1 Million Netflix Challenge"—MIT Technology Review. Oct. 6, 2006.
Helft, Miguel. "Netflix to Deliver Movies to the PC" The New York Times. Jan. 16, 2007.
InformIT "Joining the YouTube Community—And Creating Your Own Channel" May 4, 2007. 3 pages.
Inouye, et al. "System support for mobile multimedia applications." Proceedings of 7th International Workshop on Network and Operating System Support for Digital Audio and Video (NOSSDAV'97). IEEE, May 19, 1997.
Jim's Notes. Netflix-CA-000022121. Oct. 2005. 8 pages.

(56) References Cited

OTHER PUBLICATIONS

Paik & Lee, "Development of new digital broadcasting service in South Korea". Special Feature New Developments in Digital Broadcasting. Jan. 16, 2006. (with English translation) 8 pages.
Joyce, John. "Pandora and the music genome project: Song structure analysis tools facilitate new music discovery." Published on Scientific computer (http://www.scientificcomputing.com). Sep. 2006.
Kim, et al., "Optimal quality adaptation for MPEG-4 fine-grained scalable video." IEEE Infocom 2003. Twenty-second Annual Joint Conference of the IEEE Computer and Communications Societies (IEEE Cat. No. 03CH37428). vol. 1. IEEE, Mar. 30, 2003.
Lakhani, et al. "Netflix: Designing the Netflix Prize (A)". Harvard Business Publishing, Aug. 14, 2014.
Lakhani, et al. "Netflix: Designing the Netflix Prize (B)". Harvard Business Publishing, Sep. 3, 2014.
Layton, Julia, "How Pandora Radio Works" howstuffworks. (Wayback Machine) May 29, 2006. 6 pages.
Leeds, Jeff. "Big Radio Makes a Grab for Internet Listeners" The New York Times. Jun. 12, 2007.
Li & Ammar, "Bandwidth control for replicated-stream multicast video distribution." Proceedings of 5th IEEE International Symposium on High Performance Distributed Computing. IEEE,pp. 356-363. Aug. 6, 1996.
Li, Xue, Mostafa H. Ammar, and Sanjoy Paul. "Video multicast over the Internet." IEEE network 13(2):46-60. Mar. 1999.
Liu, et al. "A survey on peer-to-peer video streaming systems." Peer-to-peer Networking and Applications 1: pp. 18-28. 2008.
Logitech Squeezebox Owner's Guide. 2007. 32 pages.
Lu, Jian. "An architecture for delivering broadband video over the Internet." Proceedings. International Conference on Information Technology: Coding and Computing. IEEE, Apr. 8, 2002.
Microsoft Stories, "CinemaNow and Microsoft Announce Launch of CinemaNow's Pay-Per-View Streaming Video Service Using Windows Media". Nov. 9, 2000. 1 page.
Miller, Michael. YouTube 4 you. Pearson Education, 2007.
Mitch Green's Final Notes. Sep. 14, 2005. 14 pages.
Muchmore, Michael. "Which Movie Download Site is Best" CinemaNow1. ExtremeTech. Jan. 3, 2007. 1 page.
Muchmore, Michael. "Which Movie Download Site is Best" CinemaNow2. ExtremeTech. Jan. 3, 2007. 1 page.
Muchmore, Michael. "Which Movie Download Site is Best" MovieFlix. ExtremeTech. Jan. 3, 2007. 1 page.
Muchmore, Michael. "Which Movie Download Site is Best" Vongo. ExtremeTech. Jan. 3, 2007. 1 page.
MusicGenome's Smart DJ. (Date Unknown) Provided as allegedly prior art in Defendant's Invalidity Contentions filed Aug. 26, 2021 in case No. 2:21-cv-00080-JRG-RSP (E.D. Tex). 6 pages.
Netflix Q1 2007 Earnings Call Transcript. Apr. 18, 2007.
NetworkDesign "Network Design for the Squeezebox" Slim Devices. (Wayback Machine) Aug. 9, 2006. 2 pages.
Ott, et al. "An architecture for adaptive QoS and its application to multimedia systems design." Computer Communications 21(4):334-349. Apr. 10, 1998.
Ott, et al. "An architecture for adaptive QoS and its application to multimedia systems design." Computer Communications 21(4):334-349. Apr. 10, 1998. (Wayback Machine captured May 5, 1998).
Pandora—Find new music, listen to custom internet radio stations, "About Pandora". May 2006. 1 page.
Pandora—Find new music, listen to custom internet radio stations, "Experience Pandora—and all of your music—anywhere in your home". Apr. 2006.
Pandora Radio Blog. May 2007. 4 pages.
Pandora, "Discover music you will love" Slim Devices (Wayback Machine) Apr. 24, 2006. 1 page.
Pandora, "Pandora on the Go". (Wayback Machine) Jun. 2, 2007. 2 pages.
Pandora, blog postings from May 2006 (Archives). 13 pages.
Pandora. "Frequently Asked Questions" May 2006. 12 pages.
Pandora. "Frequently Asked Questions". May 2007. 32 pages.
Pandora. "Pandora in the Home". (Wayback Machine) May 25, 2007. 2 pages.
Perkis & Halvorsen, "Content Adaption for a streaming environment enabling Universal Multimedia Access." Department of Telecommunications. 2001.
Petrie, D. "A Framework for Session Initiation Protocol User Agent Profile Delivery (draft-ietf-sipping-config-framework-11)" Mar. 3, 2007. 60 pages.
Pogue, David. "Matchmaker Pairs Computer and Stereo" The New York Times. Feb. 9, 2006. 3 pages.
Senda & Harasaki. "A realtime software mpeg transcoder using a novel motion vector reuse and a simd optimization techniques." IEEE International Conference on Acoustics, Speech, and Signal Processing. Proceedings. ICASSP99 (Cat. No. 99CH36258). vol. 4. IEEE, Mar. 15, 1999.
Series, X. "Data Networks and Open System Communications." OSI networking and system aspects—Quality of Service, International Telecommunication Union, ITU-T Recommendation X.641. Dec. 1997.
Series, Y. "global Information Infrastructure and Internet Protocol Aspects." Internet protocol aspects—Architecture, access, network and capabilities and resource management, International Telecommunication Union, ITU-T Recommendation Y.1221. Mar. 2002.
Shacham, et al. "Ubiquitous device personalization and use: The next generation of IP multimedia communications." ACM Transactions on Multimedia Computing, Communications, and Applications (TOMM) 3(2):12-es. May 1, 2007.
Shih & Kaufman, "Netflix in 2011" Harvard Business School. Aug. 19, 2014.
Shih, et al. "Netflix" Harvard Business School. Apr. 27, 2009.
Slim Devices "PandoraSetup". Community:Wiki. (Wayback Machine). Aug. 9, 2006. 1 page.
Slim Devices Squeezebox Network Music Player v3 Datasheet. 2005. 2 pages.
Slim Devices Squeezebox Owner's Guide. 2006. 32 pages.
Sonos Digital Music System User Guide. Jun. 2007. 193 pages.
Sorrel, Charlie. "Pandora Everywhere (As Long as You Are in the US)" Wired. May 2007. 6 pages.
Thompson, Clive, "If You Liked This, You're Sure to Love That". The New York Times Magazine. Nov. 21, 2008. 11 pages.
Webb, Paula L. "YouTube and libraries: it could be a beautiful relationship." College & research libraries news 68(6):354-355. Jun. 2007.
Yang, et al. "Implementation of Personalized IP Streaming System." Proceedings of the KIEE Conference. The Korean Institute of Electrical Engineers, 2006.
YouTube "Broadcast yourself. Watch and share your videos worldwide" postings from 2005. (Wayback Machine). 5 pages.
YouTube "Broadcast yourself. Watch and share your videos worldwide" The YouTube Blog. postings from 2005-2006. (Wayback Machine). 27 pages.
YouTube "Broadcast yourself." The YouTube Blog. postings from Apr. 2007. (Wayback Machine). 11 pages.
YouTube—Broadcast Yourself "About Active Sharing". (Wayback Machine) 2007.
YouTube—Broadcast Yourself "YouTube Log In" 2007. 1 page.
IPR2021-01298: Judgement Final Written Decision dated Feb. 6, 2023. 89 pages.
"How to Upload a Video," https://www.youtube.com/watch?v=qFyIT7rVZOQ (uploaded Sept. 6, 2005) 2 pages.
"YouTube on the tube! ("Call for Help with Leo Laporte")," https://www.youtube.com/watch?v=rdwz7QiG0lk (uploaded Oct. 28, 2005). 6 pages.
Netflix.com, About Us, available at https://web.archive.org/web/20060518154101/http://www.netflix.com/MediaCenter?id=1005&hnjr=8 (captured May 18, 2006). 3 pages.
Netflix.com, Homepage, available at https://web.archive.org/web/20060610110900/http://netflix.com/ (captured Jun. 10, 2006). 1 page.
Netflix.com, Press Kit, available at https://web.archive.org/web/20070426102913/http://www.netflix.com/MediaCenter?id=5379&hnjr=8 (captured Apr. 26, 2007). 4 pages.

(56) References Cited

OTHER PUBLICATIONS

Netflix.com, Press Release: Netflix Offers Subscribers the Option of Instantly Watching Movies on Their PCs, available at https://web.archive.org/web/20071018042331/http://www.netflix.com/MediaCenter?id=5384 (Jan. 16, 2007). 2 pages.

Pandora Everywhere Platform Announcement. Pandora Everywhere (1 of 5), available at https://www.youtube.com/watch?v=tSaXPebqcsg. May 24, 2007. 3 pages.

Pandora Everywhere Platform Announcement. Pandora Everywhere (2 of 5), available at https://www.youtube.com/watch?v=5358gn6iwxA. May 24, 2007. 4 pages.

Pandora Everywhere Platform Announcement. Pandora Everywhere (3 of 5), available at https://www.youtube.com/watch?v=thl79Ex8uoQ. May 24, 2007. 3 pages.

Pandora Everywhere Platform Announcement. Pandora Everywhere (4 of 5), available at https://www.youtube.com/watch?v=G4KBNlinZGw. May 24, 2007. 3 pages.

Pandora Everywhere Platform Announcement. Pandora Everywhere (5 of 5), available at https://www.youtube.com/watch?v=-C3FYayEi84. May 24, 2007. 3 pages.

Plaintiff's invalidity claim chart, Invalidity of U.S. Pat. No. 10,911,938 by Netflix, Inc.'s Platform. Exhibit 938-12. 93 pages.

Plaintiff's invalidity claim chart, Invalidity of U.S. Pat. No. 10,911,938 by Pandora. Exhibit 938-9. 166 pages.

Plaintiff's invalidity claim chart, Invalidity of U.S. Pat. No. 10,911,938 by YouTube. Exhibit 938-8. 147 pages.

* cited by examiner

METHOD AND SYSTEM FOR A NETWORKED SELF-CONFIGURING COMMUNICATION DEVICE UTILIZING USER PREFERENCE INFORMATION

CROSS-REFERENCE TO RELATED APPLICATIONS/INCORPORATION BY REFERENCE

This patent application is a continuation of U.S. patent application Ser. No. 16/834,723, filed Mar. 30, 2020, which is a continuation of U.S. patent application Ser. No. 15/916,808, filed Mar. 9, 2018 (now U.S. Pat. No. 10,609,547), which is a continuation of U.S. patent application Ser. No. 14/949,396, filed Nov. 23, 2015 (now U.S. Pat. No. 9,918,218), which is a continuation of U.S. patent application Ser. No. 12/138,249, filed Jun. 12, 2008 (now U.S. Pat. No. 9,198,030), which makes reference to, claims priority to and claims benefit from U.S. Provisional Application Ser. No. 60/943,484, filed on Jun. 12, 2007; the entire contents of each of which are incorporated herein by reference.

This application also makes reference to:
U.S. patent application Ser. No. 11/864,184—U.S. Pat. No. 8,331,294, issued Dec. 11, 2012 filed on Sep. 28, 2007;
U.S. patent application Ser. No. 11/861,224—U.S. Pat. No. 8,027,668, issued Sep. 27, 2011 filed on Sep. 25, 2007;
U.S. patent application Ser. No. 11/861,786—U.S. Pat. No. 8,457,595, issued Jun. 4, 2013 filed on Sep. 26, 2007;
U.S. patent application Ser. No. 11/861,220 filed on Sep. 25, 2007;
U.S. patent application Ser. No. 11/864,202—U.S. Pat. No. 9,509,795, issued Nov. 29, 2016 filed on Sep. 28, 2007;
U.S. patent application Ser. No. 11/864,562—U.S. Pat. No. 8,442,015, issued May 14, 2013 filed on Sep. 28, 2007;
U.S. patent application Ser. No. 11/864,407—U.S. Pat. No. 8,331,334, issued Dec. 11, 2012 filed on Sep. 28, 2007;
U.S. patent application Ser. No. 11/864,255—U.S. Pat. No. 9,232,042, issued Jan. 5, 2016 filed on Sep. 28, 2007;
U.S. patent application Ser. No. 11/865,799—U.S. Pat. No. 7,953,038, issued May 31, 2011 filed on Oct. 2, 2007;
U.S. patent application Ser. No. 11/864,095—U.S. Pat. No. 8,553,623, issued Oct. 8, 2013 filed on Sep. 28, 2007; and
U.S. patent application Ser. No. 11/864,383 filed on Sep. 28, 2007.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communication devices. More specifically, certain embodiments of the invention relate to a method and system for a networked self-configuring communication device utilizing user preference information.

BACKGROUND OF THE INVENTION

The field of mobile and/or wireless communication has seen dramatic growth the last few years. In today's world, most people use wireless devices for various purposes, including business and personal, on a constant and daily basis. Society is truly becoming a mobile and wireless one. Numerous wireless solutions have been introduced, and have made a tremendous impact on everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS/EDGE, UMTS, and CDMA2000, incorporate substantial data capabilities. Most of today's cellular services include such features as text messaging, video streaming, and web browsing, for example.

Placing various wireless technologies in a single communication device is another trend in the wireless world. For instance, some wireless devices such as cell phones may include WLAN and WPAN functionalities. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a networked self-configuring communication device utilizing user preference information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a networked self-configuring communication device utilizing user preference information. A first personal electronic (PE) device may enable generation, updating, and/or storage of user configuration information. The user configuration information may comprise information pertaining to device configuration and/or operational preferences specific to the device user and/or various use settings, connectivity, and/or use of available resources. The generation, updating, and/or storage of the user configuration information may be performed manually and/or automatically, and may be performed directly within the first PE device and/or via networked devices, which may be communicatively coupled to the first PE device. A second PE device may be enabled to be communicatively coupled to the first PE device and/or the networked devices. The second PE device may then be enabled to download existing user configuration information from the first PE device and/or the networked device, and the downloaded user configuration may be utilized to configure the second PE device.

Figure 1A:
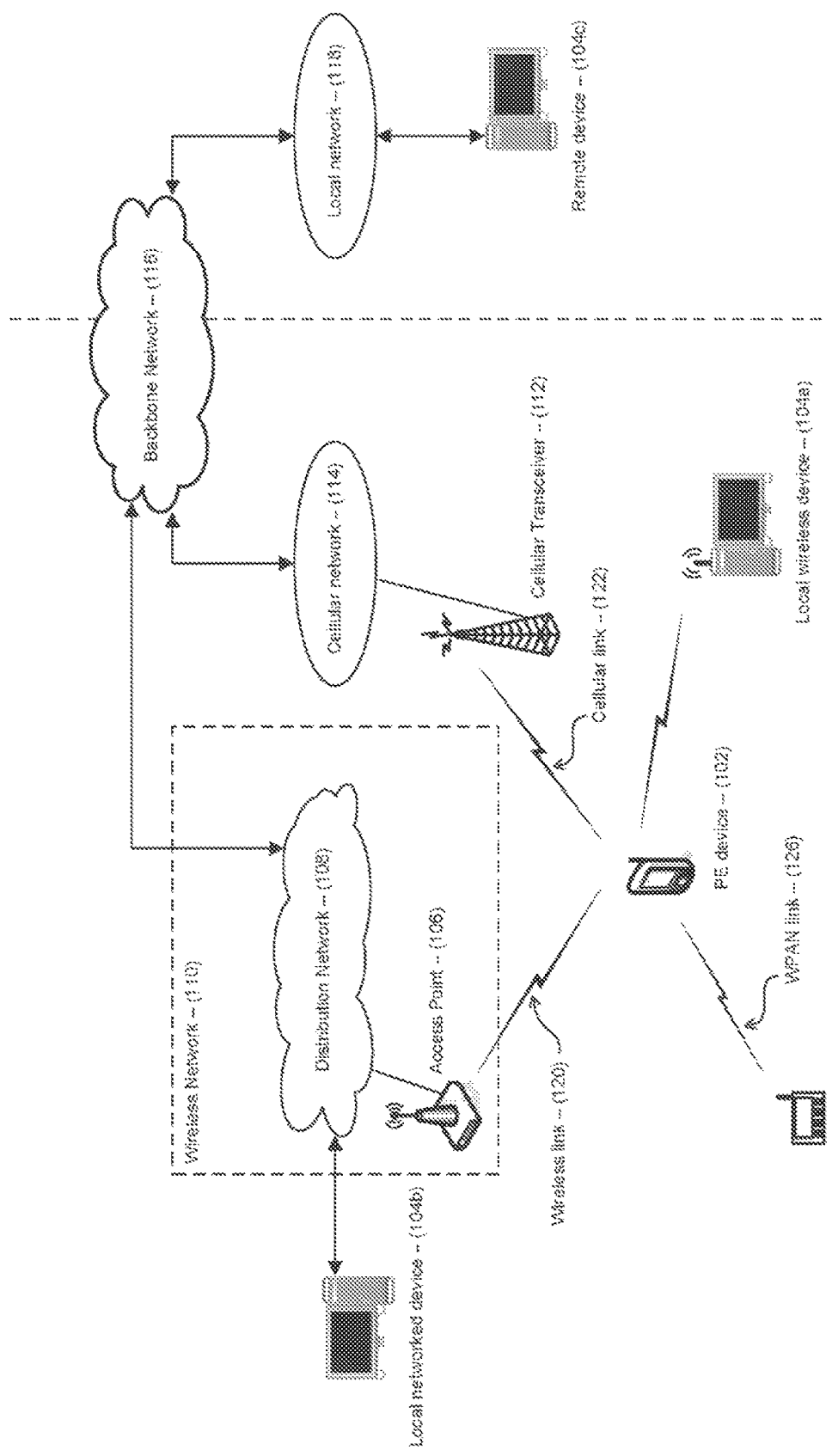
FIG. 1A is a block diagram that illustrates exemplary setup comprising a personal electronic (PE) device, which may be utilized in accordance with an embodiment of the invention.

FIG. 1 is a block diagram that illustrates exemplary setup for a personal electronic (PE) device, which may be utilized in accordance with an embodiment of the invention. Referring to FIG. 1, there is shown a personal electronic (PE) device 102, a local wireless device 104a, a local networked device 104b, a remote device 104c, and an access point 106. FIG. 1 also shows a distribution network 108, a wireless network 110, a cellular transceiver 112, a cellular network 114, a backbone network 116, a local network 118, a wireless link 120, a cellular link 122, a Personal Area Networks (PAN) device 124, and a Wireless Personal Area Networks (WPAN) link 126.

The personal electronic (PE) device 102 may comprise suitable logic, circuitry and/or code that enables performing one or more tasks requested via users of the PE device 102. For example, the PE device 102 may enable personal communication, audio/video recording and/or playing, gaming operations, and/or various other tasks, which may be requested via the PE device 102 by a user. The PE device 102 may be enabled to communicate with one or more of supported wireless and/or wired networks, and may also enable use of local and/or remote resources, to perform tasks requested via the PE device 102 for example. A user of the PE device 102 may utilize the PE device 102 directly, via supported user interfaces within the PE device 102, and/or indirectly via available networks and/or via other devices, such as the PAN device 124, which may interact with the PE device 102 via a communication interface. For example, the PE device 102 may comprise a portable handheld communication device, such as a Smartphone, a cellphone, a PDA, a multimedia device, which may be communicatively coupled to plurality of available networks, resources, and/or other communication devices which may exist locally and/or remotely.

The PE device 102 may comprise functionality that may enable utilizing one or more of available networks, to connect to available devices and/or resources for example. The network connectivity may be achieved directly, wherein the PE device 102 may be connected via wired connections, including, for example, use of a cable and/or optical interface, to LAN and/or WAN networks. The PE device 102 may also comprise one or more wireless communication interfaces, including, for example, WPAN, WLAN, and/or cellular interfaces, which may be operable to provide connectivity to corresponding networks and/or devices. The PE device 102 may comprise a user interface functionality that may enable one or more users to utilize the PE device 102 as an end user device and/or as an end user terminal device.

The PE device 102 may comprise functionality that enables generation, storage, modification, and/or utilization of user configuration information during use of the PE device 102 by a user. The user configuration information may comprise information pertaining to device configuration and/or operational preferences specific to the device user(s) and/or various use settings, connectivity, and/or use of available resources. Additionally, the PE device 102 may also comprise functionality that may enable performing user identification, for authentication and/or security purposes for example. The identification may be performed, for example, based on login information, based on compiled association information, between particular user and particular tasks and/or resource, and/or based on determined physical attributes of the user. The physical attributes of the user may be determined utilizing, for example, biometric based mechanisms within or coupled to the PE device 102. For example, the PE device 102 may comprise a biometric data acquisition subsystem which may enable performing acquisition, validation, and modification of physiological and/or behavioral biometric data. Biometric data, which may comprise finger prints, retina data, or behavioral patterns, may be unique to a person; and thus it may be utilized to identify a particular user. The PE device 102 may be utilized to enable use of plurality of the local and/or remote devices, for example, the local wireless device 104a, the local networked device 104b, and/or the remote device 104c to perform tasks requested by a user via the PE device 102.

The local wireless device 104a may comprise suitable logic, circuitry and/or code that is enabled to communicate with the PE device 102 to perform a function that may be pertinent to a task requested via the PE device 102, and for which the local wireless device 104a may be better suited to perform. The invention may not be limited to a specific device, and may comprise, for example, a general purpose processing device, a specialized processing device, a specialized peripheral device, or any combination of suitable hardware, and/or code, which may be enabled to perform a task requested via the PE device 102. For example, the local wireless device 104a may comprise a high-definition television (HDTV) set, a dedicated audio system, and/or a digital video player device, which may be optimized to provide improved audio and/or video output quality.

The local wireless device 104a may be enabled to communicate with the PE device 102 directly via wireless connections. The local wireless device 104a may be enabled to communicate with the PE device 102 via one or more the wireless protocols supported via the PE device 102, including, for example, WLAN, WiMAX, and/or WPAN such as ZigBee, Ultra-wideband (UWB), and/or Bluetooth. Alternatively, the communication between the local wireless device 104a and the PE device 102 may be performed directly based on device-specific interface, which may comprise suitable functionality that enables forming connections between specific devices. For example, the local wireless device 104a and the PE device 102 may be enabled to utilize a proprietary standard of wireless communication between these devices.

The local networked device 104b may be substantially similar to the local wireless device 104a. However, the local networked device 104b may be enabled to communicate with the PE device 102 indirectly via one or more of available local networks that the PE device 102 may be coupled with, including, for example, wireless network 110, to provide a service that may be pertinent to a task requested via the PE device 102. For example, the local networked device 104b may comprise a personal computer (PC), a printer, scanner, and/or fax device, a dedicated memory storage device, and/or a digital video recorder device. Consequently, the local service resource 104a may be utilized, for example, as a media service device which may provide multimedia streaming that may be read via the PE device 102.

The remote device 104c may be comprised substantially similar to the local networked device 104b and/or the local wireless device. However, the remote device 104c may also comprise functionality to enable remote communication with the PE device 102, via, for example, the cellular network 110, the backbone network 116, and the local network 118. For example, the remote device 104c may comprise a home PC, which may comprise improved processing subsystems and/or increased memory space. Such home PC may be better suited to perform processing and/or storage intensive tasks. The PE device 102 may utilize the remote device 104c, for example, for secure storage of data that may be created and/or maintained in the PE device 102, and/or as a backup depository for media files.

The wireless network 110 may comprise a plurality of the access point 106, the distribution network 108, and suitable logic, circuitry and/or code that may enable implementing a functional block corresponding to a wireless technology. Exemplary wireless technology may comprise for example the WLAN (IEEE 802.11) or the WiMAX (IEEE 802.16) architecture. The access point 106 may comprise suitable hardware, logic, circuitry, and/or code that may provide access network to the wireless network 110 for wireless capable devices, for example the PE device 102. The distribution network 108 may comprise suitable hardware, logic, circuitry, and/or code that may be enabled to operate as a backbone network that may be responsible for transport and link functionality for a plurality of access points in the wireless network 110.

The cellular network 114 may comprise plurality of the cellular transceiver 112, and suitable logic, circuitry and/or code that may enable communication via one or more cellular technologies. Exemplary cellular technologies may comprise CDMA, WCDMA, CDMA1000, HSDPA, GSM, GPRS, EDGE, and UMTS. The cellular transceiver 112 may comprise suitable hardware, logic, circuitry, and/or code that may be utilized to enable transmission and/or reception of cellular based communications between the cellular network 114 and cellular capable devices, for example the PE device 102. For example, the cellular transceiver 112 may correspond to cellular towers and/or base stations within a cellular communication system.

The PAN device 124 may comprise suitable logic, circuitry and/or code that may enable performing some accessory functionality in conjunction with the use of the PE device 102 based on a PAN protocol. For example, the PAN device 124 may comprise a hands-free headset that may be utilized, in conjunction with the PE device 102 to facilitated conducting cellular based calls. The PE device 102 may interact with the PAN device 124 via one or more PAN interfaces, which may be based on wired and/or wireless PAN protocols. For example, the PE device 102 may communicate with the PAN device 124 via the WPAN link 126. The WPAN link 126 may be based on a standardized technology for inter-device short range communication. For example, the WPAN link 126 may correspond to Bluetooth, ZigBee, and/or Ultra-Wideband (UWB) connections between the PAN device 124 and the PE device 102.

The backbone network 116 may comprise suitable hardware, logic, circuitry, and/or code that may be operable to provide overall system connectivity among local and/or remote sub-networks. The backbone network 116 may be enabled to interact with, and connect different wired and/or wireless technologies. For example, the backbone network may comprise a standard telephony network (POTS) that may enable data connectivity between different interface nodes linking wired and/or wireless networks comprising WLAN networks, WiMAX networks, cellular networks, and/or LAN networks.

The local network 118 may comprise suitable logic, circuitry and/or code that may enable local connectivity. This local connectivity may comprise use of Local Area Network (LAN) technologies that enable data services, including but not limited to, IEEE 802.3 Ethernet. Other technologies may comprise WiMAX. The local network 118 may be accessed, for example, by the PE device 102, via wireless network 110 and/or the cellular network 114, and the backbone network 116.

In operation, the PE device 102 may be utilized to perform one or more tasks requested via users of the PE device 102. For example, the PE device 102 may enable personal communication, playing and/or recording audio/video streams, and/or may be utilized as a gaming counsel. The PE device 102 may also enable connectivity via a plurality of available networks and/or communication interfaces, which may be necessary to perform requested tasks. For example, the PE device 102 may utilize the wireless link 120 to access the wireless network 110 via the access point 106. The PE device 102 may also utilize the cellular link 122 to access the cellular network 114 via the cellular transceiver 112. The PE device 102 may communicate with the local networked device 104b via the wireless network 110 through the access point 106 and the distribution network 108. The distribution network 108 and/or the cellular network 114 may also enable forwarding messages and/or data sent from, and to the PE device 102.

The backbone network 116 may enable connectivity between local networks, for example wireless network 110 and/or the cellular network 114, and remote networks, comprising, for example, the local network 118. Protocol-based operations may be performed to facilitate the transmission of information through all the different components. This may comprise use of exemplary protocols such as TCP, IP, UPD, and/or SS7. Network connectivity and/or communication interfaces supported via the PE device 102 may enable communicating with other devices. For example, the PE device may communicate with the local networked device 104*b* via the wireless network 110. The remote device 104*c* may be enabled to communicate with the PE device 102 through the backbone network 116, via the local network 118. The PE device 102 may also be enabled to communicate directly with other devices and/or resources. For example, the PE device 102 may communicate directly with the PAN device 124 via the WPAN link 126. The PE device 102 may also communicate directly with the local wireless device 104*a*, and such communication may be based on existing wireless and/or wired interfaces, and/or the communication may be based on device-specific interfaces that may be limited to class of devices comprising the PE device 102 and the local wireless device 104*a*.

A user of the PE device 102 may request tasks that may be performed directly via the PE device 102, and/or via the connectivity of PE device 102 to available networks, devices, and/or resources. For example, the PE device 102 may be enabled to communicate with the local networked device 104*b* and/or the remote device 104*c* to facilitate accessing services provided by the local networked device 104*b* and/or the remote device 104*c*. The PE device 102 may be enabled, for example, to access media, storage, processing, and/or gaming services based on one or more tasks requested by a user of the PE device 102. The PE device 102 may also be enabled to utilize devices available directly via communication interfaces within the PE device 102. In an exemplary embodiment of the invention, when requested by a user, the PE device 102 may communicate multimedia files received from the local networked device 104*b* and/or the remote device 104*c* to the local wireless device 104*c*, which may enable, improved output quality of audio and/or video contents of the multimedia files.

The PE device 102 may be enabled to generate, store, and/or update user configuration information that may be utilized in facilitating use of the PE device 102 by a particular user to perform requested tasks, and/or in identifying and/or authenticating the user. The user configuration information may also be generated, stored, and/or updated remotely, in the remote device 104*c* for example, based on communications via the PE device 102, to ensure security and/or efficiency. The user configuration information may comprise, for example, information pertaining to device configuration and/or operational preferences specific to the device user and/or various use settings, network connectivity, service access, secure access information, network and service access information and/or preferences that are unique to particular users, and/or manner of use of available resources. For example, the user configuration information may specify various user specific device operational preferences, comprising favorite broadcast channels and/or website, favorite games, game status information, and media consumption settings. Exemplary media consumption settings may comprise file types and/or video or audio presentation preferences, website access information, user interface configuration preferences, and/or directory information. The user configuration information may also specify particular devices, for example, the remote device 104*c*, which may be accessed to perform certain type of operations and/or to store and retrieve specific category of data. The user configuration information may also specify connectivity related information comprising, for example, types of networks to be connectively coupled to, the wireless network 110 for example, and/or other performance related criteria such as cost, availability, bandwidth level, QoS capabilities, security, and reliability. The PE device 102 may also enable a set of the plurality of supported users to share user configuration information, wherein such set of users may be treated as a specific group.

The PE device 102 may also be enabled to identify a particular user in a variety of manners. For example, the PE device 102 may identify a particular user by login information, which may be determined based on user configuration information; physical attributes of the person, which may be derived from biometric functionality that may integrated within the PE device 102 or utilized externally to it; and/or based on predetermined associations between particular user and peripheral devices, resources, and/or communication interfaces.

Figure 1B:
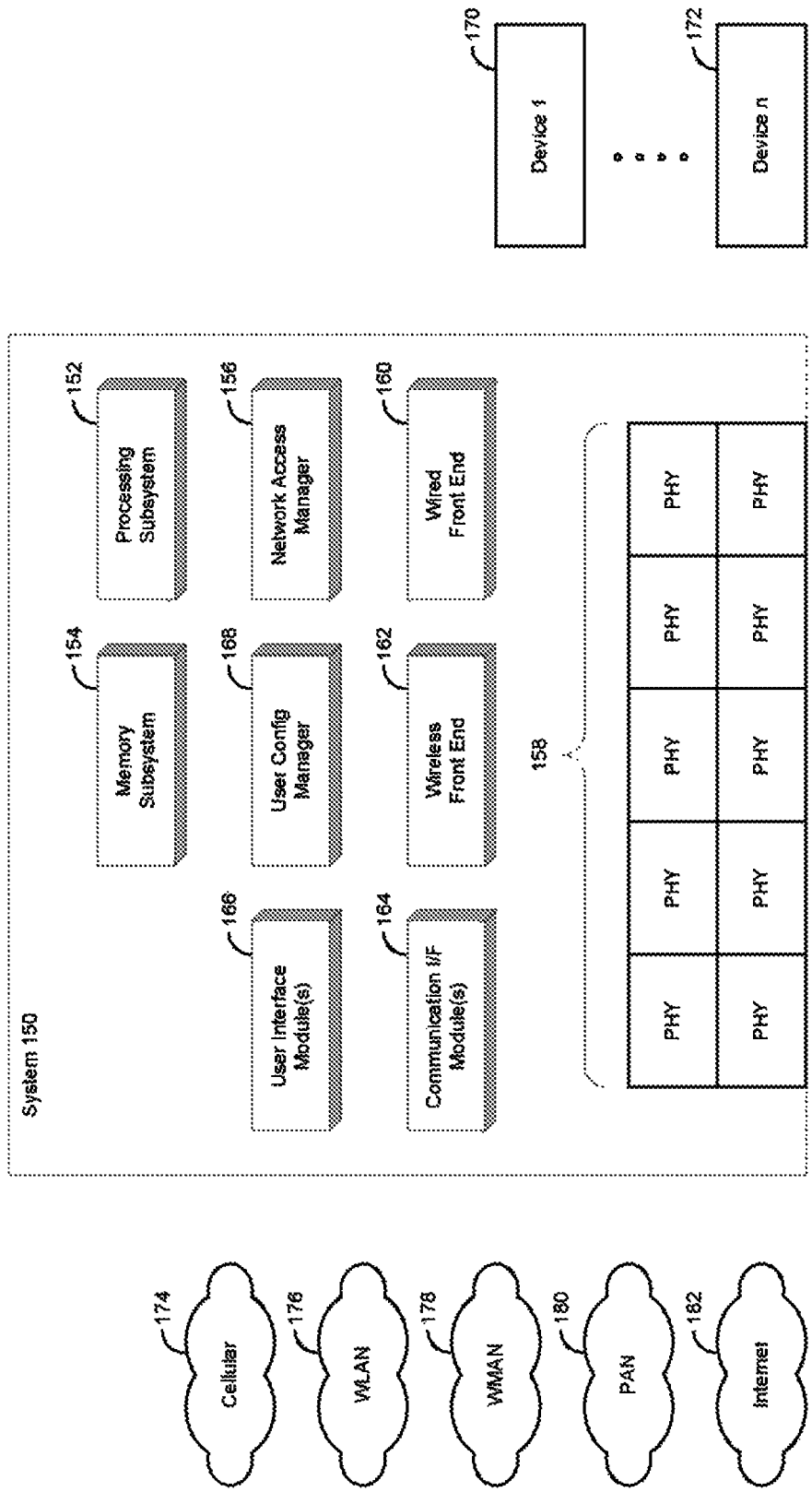
FIG. 1B is a block diagram that illustrates an exemplary system that may be integrated within a personal electronic (PE) device to enable management of user configuration, and utilization of plurality of communication interfaces and/or devices, in accordance with an embodiment of the invention.

FIG. 1B is a block diagram that illustrates an exemplary system that may be integrated within a personal electronic (PE) device to enable management of user configuration, and utilization of plurality of communication interfaces and/or devices, in accordance with an embodiment of the invention. Referring to FIG. 1B, there is shown a system 150, a processing subsystem 152, a memory subsystem 154, a network access manager 156, a plurality of PHY layers 158, a wired front-end 160, a wireless front-end 162, a communication interface module 164, a user interface modules 166, a user configuration manager 168, a plurality of devices 170, . . . , 172, a cellular network 174, a wireless local area network (WLAN) 176, a Wireless Metropolitan Area Networks (WMAN) 178, a Personal area network (PAN) 180, and an internet network 182.

The system 150 may comprise the processing subsystem 152, the memory subsystem 154, the network access manager 156, the plurality of PHY layers 158, the wired front-end 160, the wireless front-end 162, the communication interface modules 164, the user interface modules 166, the user configuration manager 168. The system 150 may also comprise additional suitable logic, circuitry, and/or code that may enable management of user configuration, and utilization of plurality of communication interfaces and/or devices.

The processing subsystem 152 may comprise suitable logic, circuitry and/or code that enables performing processing operations. The invention may not be limited to a specific processor, but may comprise for example, a general purpose processor, a specialized processor or any combination of suitable hardware, firmware, software and/or code, which may be enabled to provide particular processing operations. For example, the processing subsystem 152 may comprise a plurality of processors that may enable performing various processing operations, comprising general control and/or processing functionality, and/or processing pertinent to particular tasks and/or operations. The memory subsystem 154 may comprise suitable logic, circuitry and/or code that may enable storage and/or retrieval of data and/or code in the system 150. For example, the memory subsystem 154 may comprise a plurality of memory components which may be utilized by the processing subsystem 152 and/or the remaining subsystems and/or components in system 150 during various operations in the system.

The network access manager 156 may comprise suitable logic, circuitry, and/or code that may enable performing management and/or control operations that may facilitate access to available networks. For example, the network access manager 156 may be utilized within the system 200 to enable access to one or more of the cellular network 174, the WLAN network 176, the WMAN network 178, the PAN network 180, and/or the internet network 182. Each of the plurality of PHY layers 158 may correspond to the physical layer within the Open System Interface (OSI) model, which may enable transmitting raw bits via communication links based on a wired or wireless interface. For example, one of the plurality of PHY layers 158 may correspond to the physical layer within the Bluetooth stack, which may comprise functionality that enable transmission and/or reception of raw bits via Bluetooth based communication links.

The wired front-end 160 may comprise suitable logic, circuitry and/or code that may enable transmission and/or reception of communication via one or more wired interfaces, based on, for example, one or more of the plurality of PHY layers 158. For example, the wired front-end 160 may enable communications via USB terminals, modem connectivity, external memory devices interfaces, and/or FireWire interface. The wireless front-end 162 may comprise suitable logic, circuitry and/or code that may enable transmission and/or reception of communication via one or more wireless based interface, based on, for example, one or more of the plurality of PHY layers 158. For example, the wireless front-end 162 may comprise antenna systems that may enable transmission and/or reception of communication via WLAN, Bluetooth, WiMAX, and/or cellular based interfaces.

The communication interface modules 164 may comprise suitable logic, circuitry and/or code that enables, via the system 150, utilization, control, and/or management of communication via plurality of communication interfaces, for example via the wired front-end 160 and/or the wireless front-end 162, based on one or more corresponding layers in the plurality of the PHY layer 158. For example, the communication interface modules 164 may comprise modules to enable communication via various wireless and/or wired communication interface, comprising, Bluetooth interface, other WPAN (IEEE 802.15) interface, WLAN (IEEE 802.11) interface, WiMAX (IEEE 802.16) interface, Mobile Broadband Wireless Access (MBWA, IEEE 802.20) interface, Time Division Multiple Access (TDMA) interfaces, GSM/GPRS/EDGE interfaces, CDMA/CDMA200/WCDMA interfaces, H.323 interface, USB interface, and/or Modem interface.

The user interface modules 166 may comprise suitable logic, circuitry and/or code that enables utilization of various user interfaces that may be available via the system 150. For example, the system 150 may be integrated within a device, for example the PE device 102, to enable supporting user interfaces in the device to enable direct interactions with the device by users of the device. The user interface modules 166 may enable utilization of video based input/output (I/O) interfaces, via display and/or digital camera components in the system 150 for example; the user interface modules 166 may also enable of audio based I/O interfaces, via speaker and/or microphone components in the system 150 for example. The user interfaces modules 166 may also enable utilization of physical based input/output (I/O) interfaces, via touch screen, vibration, gyroscopic and/or keypad components in the system 150 for example.

The user configuration manager 168 may comprise suitable logic, circuitry and/or code that enables performing of management and/or control operations pertaining to the user configuration information corresponding to a supported user, or a group of users, of a device that may comprise the system 150. For example, where the system 150 may be integrated within the PE device 102, the user configuration manager 168 may enable generation, storage, updating, and/or use of user configuration information, substantially as described with respect to FIG. 1.

Each of the plurality of devices 170, . . . , 172, may comprise suitable logic, circuitry and/or code that is enabled to provide, external to device comprising the system 150, various services and/or functionality that may be necessary to perform a requested task via the system 150. For example, the plurality of devices 170, . . . , 172, may comprise the local wireless device 104a, the local networked device 104b, and/or the remote device 104c, substantially as described with respect to FIG. 1.

The cellular network 174 may comprise suitable logic, circuitry and/or code that may enable implementing a functional block corresponding to a cellular technology, comprising, for example, but not limited to, CDMA, WCDMA, CDMA1000, HSDPA, GSM, GPRS, EDGE, and/or UMTS. The WLAN network 176 may comprise suitable logic, circuitry and/or code that may enable implementing a functional block corresponding to a WLAN protocol, including, for example, IEEE 802.11. The WMAN network 178 may comprise suitable logic, circuitry and/or code that may enable implementing a functional block corresponding to a WMAN protocol, comprising, for example, IEEE 802.16. The PAN network 180 may comprise suitable logic, circuitry and/or code that may enable implementing a functional block corresponding to a PAN interface. The PAN network 180 may comprise wired based connectivity, via buses such as Universal Serial Bus (USB), for example. Additionally, wireless personal area network (WPAN) may be utilized, comprising, for example, WPAN protocols such as Bluetooth (IEEE 802.15), UWB, and/or ZigBee. The Internet network 182 may comprise suitable logic, circuitry and/or code that may enable implementing a functional block corresponding to an internet protocol, including Internet Protocol (IP) for example.

In operation, the system 150 may be integrated within a device, for example the PE device 102, to enable management of user configuration, and utilization of plurality of communication interfaces and/or devices. The processing subsystem 152 and/or the memory subsystem 152 may be utilized to enable overall control and management, and/or to enable management and/or control during particular operations within the system 150, for example, during DSP, audio, and/or video processing.

The system 150 may enable connectivity related operations to facilitate performing tasks requested via the PE device 102. For example, network connectivity may be performed via the network access manager 156, which may enable managing access to one or more of the cellular network 174, the WLAN network 176, the WMAN network 178, the PAN network 180, and/or the internet network 182. During network accessibility operations, the system 150 may utilize appropriate PHY functionality, within the plurality of PHY layers 158, to enable transmission and/or reception of communication between the system 150 and the corresponding network. For example, to facilitate connectivity with the WLAN network 176, the network access manager 156 may be enabled to utilize a WLAN PHY within the plurality of PHY layers 158 to enable the system 150 to perform WLAN based communications. The system 150 may also enable the PE device 102 to utilize one or more of the plurality of devices 170, . . . , 172, which may be utilized to perform specific operations that may not be available, or optimal, directly via the PE device 102. Network connectivity, via the network access manager 156, may be utilized to enable access to the desired devices. Additionally, the system 150 may be enabled to utilize appropriate PHY functionality within the plurality of PHY layers 158, to enable direct transmission and/or reception of messaging between the system 150 and the corresponding device(s).

The system 150 may enable a user of the PE device 102 to interact indirectly via the user interface modules 166. For example, the user interface modules 166 may enable users of the PE device 102 via video based I/O interfaces, audio based I/O interfaces, and/or physical based I/O interfaces. The system 150 may also enable the user to communicate indirectly, via network connectivity. For example, communications between users and the system 150 may be transmitted and/or received via the wireless front-end 256 and/or the wired front-end 258, based on one or more of the various interfaces supported via the communication modules 164.

The user configuration manager 168 may enable performing user configuration operation via the system 150, including, for example, generation, storage, and/or update of user configuration information. The user configuration operations may be performed directly via system 150. For example, the user configuration manager 168 may enable performing generation, storage, and/or updating of user configuration information within the system 150, via the processing subsystem 152 and/or the memory subsystem 154. In some instances, at least a portion of the user configuration operations may be performed external to the system 150, utilizing, for example, network connectivity and/or accessibility to available devices and/or resources via various communication interfaces. For example, the user configuration manager 168 may be enabled to communicate with one or more of the plurality of devices 170, . . . , 172, via the network access manager 156 and/or the communication interface modules 166, to enable performing at least a portion of the generation, storage, and/or updating of user configuration information via such devices.

The generation of the user configuration information, via the user configuration manager 168, may be performed automatically, during initial setup on a device comprising the system 150 for example. The generation of the user configuration information may also be perform manually, based on user commands, for example, which may communicated directly into the system 150 via the user interface 166, and/or indirectly via the communication interface modules 164 for example. The generated user configuration information may be updated. The updating of the user configuration information may be performed manually, based on user commands for example, which may communicated directly into the system 150 via the user interface 166, and/or indirectly via the communication interface modules 164. In some instances, the updating of the user configuration information may be performed automatically, based on pre-determined conditions. For example, the user configuration information may be updated and/or modified at pre-determined periodic intervals, when a device comprising the system 150 is used in manner different than existing operational preferences, and/or when an update is triggered by specified use and/or operating conditions.

Generated and/or updated user configuration information may be stored within the system 150, for example via the memory subsystem 154. Alternatively, the generated and/or updated user configuration information may be uploaded into a remote storage entity, within one or more of the plurality of devices 170, . . . , 172 for example.

Figure 2:
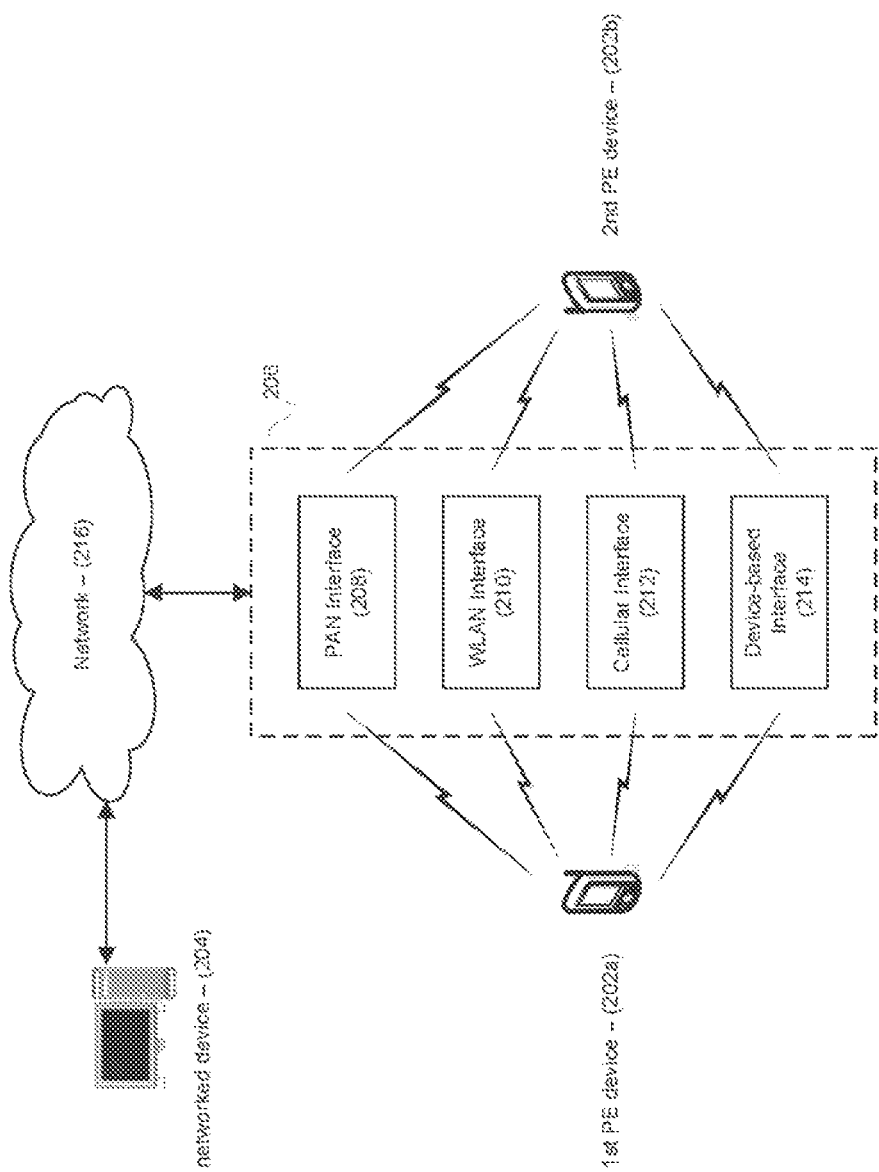
FIG. 2 is a block diagram that illustrates use of stored user preference information to configure a secondary personal electronic (PE) device, in accordance with an embodiment of the invention.

FIG. 2 is a block diagram that illustrates use of stored user preference information to configure a secondary personal electronic (PE) device, in accordance with an embodiment of the invention. Referring to FIG. 2, there is shown a first PE device 202a, a second PE device 202b, a networked device 204, a plurality of communication interfaces 206, a personal area network (PAN) interface 208, a Wireless Local Area Network (WLAN) interface 210, a cellular interface 212, and a device-based interface 214, and a network 216.

Each of the PE devices 202a and 202b may be substantially similar to the PE device 102. For example, each of the PE devices 202a and 202b may comprise an instance of the system 150 to enable management of user configuration, and utilization of plurality of communication interfaces and/or devices. The networked device 204 may comprise a device that may be enabled to communicate with the PE devices 202a and/or 202b, via the plurality of communication interfaces 206 and/or the network 216 for example, to enable performing tasks requested via the PE devices 202a and/or 202b. For example, the networked device 204 may be substantially similar to the local wireless device 104a, the local networked device 104b, and/or the remote device 104c.

The plurality of communication interfaces 206 may comprise one or more interfaces that may enable direct communications between PE devices 202a and 202b, and/or may enable connectivity to the networked device 204, via the network 216 for example. The plurality of communication interfaces 206 may comprise one or more wireless interfaces. The invention may not be limited to a specific type of wireless interface, but may comprise for example, the PAN interface 208, the WLAN interface 210, and/or the cellular interface 212. The plurality of communication interfaces 206 may also comprise the device-based interface 214, which may enable communication between specific types of devices. The PAN interface 208 may comprise suitable functionality that enables forming connections based on the PAN protocol, including, for example, Bluetooth (IEEE 802.15), ZigBee, and/or UWB. The WLAN interface 210 may comprise suitable functionality that enables forming connections based on the WLAN standard (IEEE 802.11). The cellular interface 212 may comprise suitable functionality that enables forming connections based on one or more cellular standards comprising GSM/GPRS/EDGE, CDMA, HSDPA, UMTS, LTE and CDMA2000. The device-based interface 214 may comprise suitable functionality that enables forming connections between specific devices. For example, the PE device 202a, the PE device 202b, and/or the networked device 204 may be enabled to utilize a proprietary standard of wireless protocol to facilitate communication between these devices.

The network 216 may comprise suitable hardware, logic, circuitry, and/or code that is operable to provide connectivity among local and/or remote sub-networks. The network 216 may be enabled to interact with, and connect to different wired and/or wireless interfaces. For example, the network 216 may comprise a telephony network such as a plain old telephone system (POTS) and/or an a packet based network that may enable data connectivity between different interface nodes linking wired and/or wireless networks comprising WLAN networks, WiMAX networks, PAN networks, cellular networks, and/or LAN networks. The network 216 may enable use of the networked device 204, via the plurality of communication interfaces 206, by the PE devices 202a and/or 202b, to perform various requested tasks, including, for example, storage and/or retrieval of user configuration information.

In operation, the PE device 202a may be enabled to develop user configuration information. For example, the 202a may comprise the system 150, and may be able generate, store, and/or update the user configuration information, substantially as described with respect to FIG. 1A. The user configuration information may be developed directly within the PE device 202a, utilizing, for example, the system 150, substantially as described with respect to FIG. 1B.

The user configuration information development, maintenance and/or administration may also be performed remotely, in the networked device 204, based on communication transmitted and/or received by the PE device 202a, via the plurality of communication interfaces 206 and/or the network 216 for example. The user configuration information may be stored directly within the PE device 202a, via the memory subsystem 154 in the system 150 for example. The user configuration information may also be uploaded, downloaded and/or otherwise communicated to the networked device 204 device, via network connectivity between the PE device 202a and networked device 204, to enable remote and/or secure storage, utilizing, for example, the system 150, substantially as described in FIG. 1B. The uploading of user configuration information may be performed manually, based on user commands, which may be communicated into the PE device 202a via the user interface modules 166 in the system 150, substantially as described in FIG. 1B. The uploading of the user configuration information may also be performed automatically, based on specified intervals and/or conditions for example. The user configuration information may be updated, via the PE device 202a for example, and the updated user configuration information may be uploaded into the networked device 204. The updating of the user configuration information may be performed manually, based on user commands, and/or it may be performed automatically, during use of the PE device 202a, based on, for example, specific use conditions.

Where a user of the PE device 202a may initiate use of a secondary PE device, for example the PE device 202b, it may be advantageous to import into the PE device 202b, existing user configuration information generated and/or updated via the PE device 202a. The existing user configuration information may be downloaded into the PE device 202b, and may be utilized, for example, to configure the PE device 202b with similar operations preferences as with the PE device 202b, which are specific to the user of both devices. The PE device 202b may be enabled to receive the user configuration information directly from the PE device 202a. For example, the PE devices 202s and 202b may be enabled to communicate directly via the plurality of communication interfaces 206. The PE device 202b may be enabled, for example, to request and/or receive the user configuration information from the PE device 202a via the PAN interface 208, the WLAN interface 210, the cellular interface 212, and/or the device-specific interface 214. In some instances, the device 202b may also be enabled to receive the user configuration information via a networked device, for example the networked device 204, which may be utilized and a centralized depository for user configuration information accessible by one or more users. For example, user configuration information developed, stored, and/or updated by the PE device 202a via the networked device 204 may be received by PE device 202b from the networked device 204.

The PE device 202b may be enabled, for example, to request and/or receive the user configuration information from the networked device 204 via the network 216 and/or the plurality of communication interfaces 206. The downloading and/or use of the user configuration information by the PE device 202b may be performed manually, based on user commands for example; and/or it may be performed automatically, based on, for example, specific use conditions. For example, initiating download and configuration of the PE device 202b utilizing existing user configuration information may be performed via user commands communicated into the PE device 202b, via the user interface modules 166 in the system 150 for example, substantially as described in FIG. 1B. In some instances, it may be determined whether a match may exist between a user of the PE device and identity of user corresponding to user configuration information stored within the PE device 202a. The networked device 204 may be operable to automatically trigger download and configuration of the PE device 202b utilizing existing user configuration information.

Figure 3:
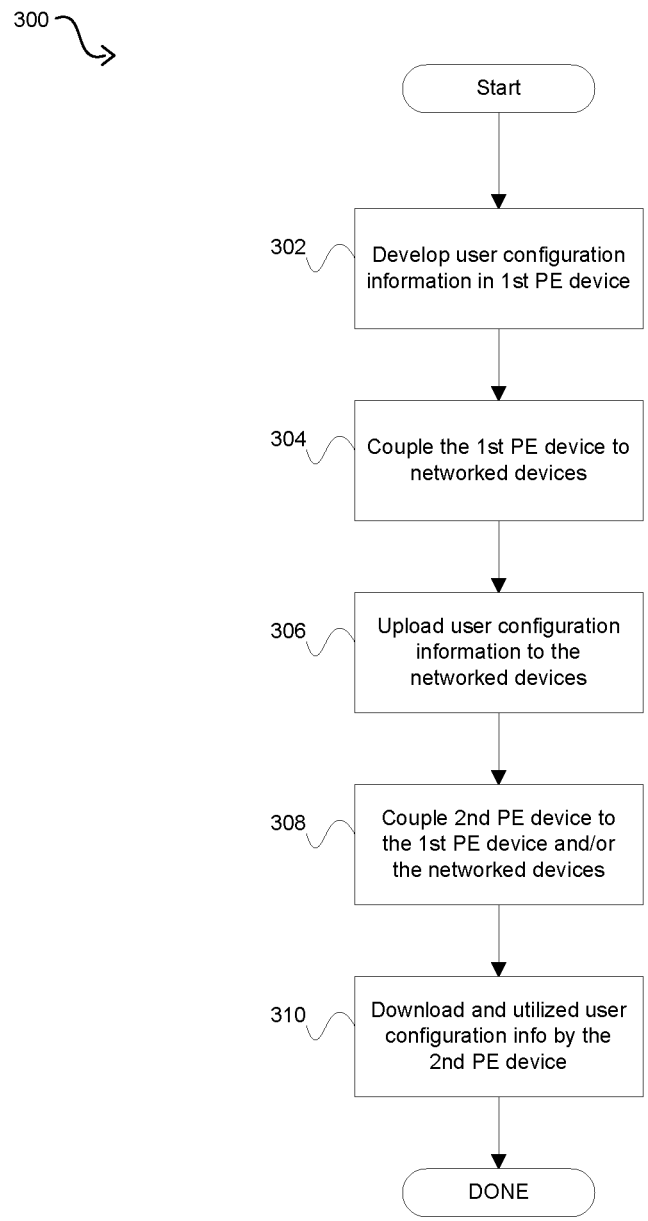
FIG. 3 is a flow chart that illustrates use of stored user preference information to configure a secondary personal electronic (PE) device, in accordance with an embodiment of the invention.

FIG. 3 is a flow chart that illustrates use of stored user preference information to configure a secondary personal electronic (PE) device, in accordance with an embodiment of the invention. Referring to FIG. 3, there is shown a flow chart 300 comprising a plurality of exemplary steps, which may enable.

In step 302, user configuration information may be developed via a first personal electronic (PE) device. For example, user configuration information may be generated and/or updated via the PE device 202a, substantially as described in FIG. 2. In step 304, the PE device may be communicatively coupled to networked devices to enable generation, updating, and/or storage of user configuration information. For example, the PE device 202a may be communicatively coupled to the networked device 204, substantially as described in FIG. 2, to enable uploading of user configuration information. In an embodiment of the invention, the coupled networked device may also be utilized to perform the generation and/or updating of the user configuration information based on communication by the PE device.

In step 306, user configuration information may be uploaded from the PE device to the networked device. For example, user configuration information may be uploaded from the PE device 202a to the networked device 204. In step 308, a second PE device may be communicatively coupled to the first PE device and/or the networked devices. For example, the PE device 202b may be communicatively coupled to the PE device 202a, and/or the networked device 204, via the network 216 and/or the plurality of communication interface 206, substantially as described in FIG. 2. In step 310, the second PE device may download and use user configuration information. For example, the PE device 202b may download the user configuration information from the PE device 202a and/or the networked device 204, and the downloaded user configuration information may be utilized to enable configuring the PE device 202b using, for example, existing user operational preferences.

Various embodiments of the invention may comprise a method and system for a networked self-configuring communication device utilizing user preference information. The personal electronic (PE) device 202a may enable generation, updating, and/or storage of user configuration information. The user configuration information may comprise information pertaining to device configuration and/or operational preferences specific to the device user and/or various use settings, connectivity, and/or use of available resources. The generation, updating, and/or storage of the user configuration information may be performed manually and/or automatically, and may be performed directly within the PE device 202a and/or via the networked device 204. The generation, updating, and/or storage of the user configuration information may also be performed directly within the PE device 202a, and/or via the networked device 204, which may be communicatively coupled to the PE device 202a. The PE device 202b may be enabled to communicatively couple to the PE device 202a and/or the networked device 204. The PE device 202b may then be enabled to download existing user configuration information from the PE device 202a and/or the networked device 204; and the downloaded user configuration may be utilized to configure the PE device 202b.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a networked self-configuring communication device utilizing user preference information.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A system for automatically associating user configuration information with additional user devices, comprising:
   a plurality of computing devices in communication via one or more networks with a first electronic device of a user and a second electronic device of the user;
   wherein the computing devices comprise processing circuitry in communication with a centralized or distributed memory subsystem storing a centralized or distributed user configuration manager and user configuration information, the computing devices being remote from the first electronic device and the second electronic device; and
   wherein the user configuration manager comprises executable logic that, when executed by the processing circuitry, causes the computing devices to:
      receive login information, compiled association information, and/or physical attributes of the user, from the first electronic device of the user via the one or more networks, the compiled association information comprising associations between the user and peripheral devices, resources, and/or communication interfaces,
      retrieve, from the memory subsystem, the user configuration information corresponding to the user,
      control provision of a media content streaming service to the first electronic device based on the user configuration information corresponding to the user,
      update the user configuration information corresponding to the user based on the provision of the media content streaming service to the first electronic device,
      subsequently receive login information, compiled association information, and/or physical attributes of the user, from the second electronic device of the user via the one or more networks,
      identify the user based on the login information, compiled association information, and/or physical attributes of the user received from the second electronic device,
      retrieve, from the memory subsystem, the updated user configuration information corresponding to the user, responsive to the identification of the user based on the login information, compiled association information, and/or physical attributes of the user received from the second electronic device, and
      control provision of the media content streaming service to the second electronic device based on the updated user configuration information corresponding to the user.

2. The system of claim 1, wherein the user configuration manager further comprises executable logic that, when executed by the processing circuitry, causes the computing devices to transmit the updated user configuration information corresponding to the user to the second electronic device via the one or more networks, responsive to the identification of the user based on the login information received from the second electronic device.

3. The system of claim 1, wherein the user configuration manager further comprises executable logic that, when executed by the processing circuitry, causes the computing devices to modify the updated user configuration information to include an association of the second electronic device with the first electronic device.

4. The system of claim 1, wherein the user configuration manager further comprises executable logic that, when executed by the processing circuitry, causes the computing devices to generate the user configuration information corresponding to the user, responsive to receipt of the login information, compiled association information, and/or physical attributes of the user from the first electronic device of the user, the user configuration information being stored in the memory subsystem.

5. The system of claim 1, wherein the user configuration manager further comprises executable logic that, when executed by the processing circuitry, causes the computing devices to dynamically develop the user configuration information corresponding to the user during provision of the media content streaming service to the first electronic device.

6. The system of claim 1, wherein the user configuration information corresponding to the user includes media consumption settings including at least video and audio presentation preferences corresponding to one or more of the user, the first electronic device, and the second electronic device, and
the processing circuitry is configured to control provision of the media content streaming service to the first electronic device and the second electronic device based on the media consumption settings corresponding to the one or more of the user, the first electronic device, and the second electronic device.

7. The system of claim 6, wherein the media consumption settings corresponding to the first electronic device are different than the media consumption settings corresponding to the second electronic device.

8. The system of claim 1, wherein the user configuration information corresponding to the user includes information identifying content reproduction capabilities of the first electronic device and the second electronic device; and
wherein the centralized or distributed user configuration manager further comprises executable logic that, when executed by the processing circuitry, causes the computing devices to, based on the information identifying content reproduction capabilities of the first electronic device and the second electronic device:
select a first version of content, from a plurality of stored versions of content, to be streamed to the first electronic device, and
select a different second version of content, from the plurality of stored versions of content, to be streamed to the second electronic device.

9. The system of claim 1, wherein the user configuration information corresponding to the user includes connectivity related information comprising at least one of a network type, bandwidth level, and quality of service capabilities of the first electronic device and the second electronic device; and
wherein the centralized or distributed user configuration manager further comprises executable logic that, when executed by the processing circuitry, causes the computing devices to, based on the connectivity related information of the first electronic device and the second electronic device:
select a first version of content, from a plurality of stored versions of content, to be streamed to the first electronic device, and
select a different second version of content, from the plurality of stored versions of content, to be streamed to the second electronic device.

10. The system of claim 1, wherein the media content streaming service comprises a service system for delivering streaming video and audio content.

11. The system of claim 1, wherein the login information of the user is input via a user interface of the first electronic device of the user.

12. The system of claim 1, wherein a first computing device of the computing devices controls provision of the media content streaming service to the first electronic device, and a second computing device of the computing devices controls provision of the media content streaming service to the second electronic device.

13. The system of claim 1, wherein the login information is received, wherein the login information enables user identification a specific person.

14. The system of claim 1, wherein the computing devices are in communication with the first electronic device and the second electronic device at least partially over a backbone network.

15. The system of claim 14, wherein the backbone network comprises a wired network.

16. The system of claim 14, wherein the backbone network is coupled to remote subnetworks.

17. The system of claim 1, wherein the second electronic device communicates with the user configuration manager using an access point for a local area wireless network, and the computing devices are remote from the local area wireless network.

18. The system of claim 1, wherein the computing devices are configured to store a network access manager; and
wherein the network access manager comprises executable logic that, when executed by the processing circuitry, the computing devices to enable access to one or more of a cellular network and a wired local area network for the updated user configuration information.

19. The system of claim 1, wherein the first electronic device communicates with the user configuration manager using a cellular network.

20. The system of claim 1, wherein the computing devices are configured to store a network access manager; and
wherein the network access manager comprises executable logic that, when executed by the processing circuitry, causes one or more of the computing devices to enable access to one or more of a cellular network and a wired local area network for the updated user configuration information.

21. The system of claim 1, wherein the user configuration information corresponding to the user comprises user presentation preferences corresponding to the user, the first electronic device, and the second electronic device, and
the processing circuitry is configured to control the provision of the media content streaming service to the first electronic device and the second electronic device based on media consumption settings corresponding to one or more of the user, the first electronic device, and the second electronic device.

22. The system of claim 1, wherein the first electronic device and the second electronic device support a set of users that share the user configuration information.

23. The system of claim 1, wherein the user configuration information is generated during access to the media content streaming service by the second electronic device at a time prior to receipt of the login information, compiled association information, and/or physical attributes of the user from the first electronic device.

24. The system of claim 1, wherein the user configuration information causes the first electronic device to configure the media content streaming service using configuration or preferences for receiving streaming media content by the second electronic device, without user intervention.

25. The system of claim 1, wherein the user configuration information causes the first electronic device to configure a streaming media client application using configuration or preferences for receiving streaming media content by the second electronic device without user intervention.

26. The system of claim 1, wherein the second electronic device is not identified by the computing devices as being associated with the first electronic device until after subsequently receiving login information, compiled association information, and/or physical attributes of the user, from the second electronic device of the user via the one or more networks.

27. A method for automatic configuration for receiving streaming media content by an electronic device based on association with another electronic device, the method comprising:
    receiving, by one or more network interfaces of a computing system comprising computing devices from a first electronic device, login information, compiled association information, and/or physical attributes of a user, the compiled association information comprising associations between the user and peripheral devices, resources, and/or communication interfaces;
    retrieving, by the computing system from a centralized or distributed memory subsystem of the computing devices, user configuration information associated with the user and a second electronic device, the user configuration information comprising configuration or preferences for receiving streaming media content by the second electronic device, wherein the computing devices are remote from the first electronic device and the second electronic device;
    transmitting, by the one or more network interfaces to the first electronic device, at least a portion of the retrieved user configuration information, receipt of the user configuration information causing the first electronic device to configure a streaming media client application using the configuration or preferences for receiving streaming media content by the second electronic device; and
    controlling, by the computing system, provisioning of a media content streaming service to the first electronic device based on the user configuration information.

28. The method of claim 27, wherein the user configuration information is generated during access to the media content streaming service by the second electronic device at a time prior to receipt of the login information, compiled association information, and/or physical attributes of the user from the first electronic device.

29. The method of claim 27, further comprising:
    updating, by the computing system, the user configuration information based on configuration or preferences for receiving streaming media content by the first electronic device.

30. The method of claim 27, further comprising:
    transmitting, by the computing system, at least a portion of the updated user configuration information to the second electronic device, receipt of the updated user configuration information causing the second electronic device to configure a second streaming media client application using the configuration or preferences for receiving streaming media content by the first electronic device.

31. The method of claim 30, wherein transmitting the at least a portion of the retrieved user configuration information causes the first electronic device to configure the streaming media client application using the configuration or preferences for receiving streaming media content by the second electronic device, without user intervention.

32. The method of claim 30, wherein the centralized or distributed user configuration manager is provided on a remote device.

33. The method of claim 30, wherein the computing devices are in communication with the first electronic device and the second electronic device at least partially over a backbone network.

34. The method of claim 33, wherein the backbone network comprises a wired network coupled to remote subnetworks.

35. The method of claim 27, wherein the second electronic device communicates with the user configuration manager using an access point for a local area wireless network, and the computing devices are remote from the local area wireless network.

36. The method of claim 27, further comprising:
    causing the computing devices to enable access to a cellular network and a wireless local area network for the updated user configuration information.

37. The method of claim 27, wherein the first electronic device communicates with the user configuration manager using a cellular network.

38. The system of claim 27, wherein the first electronic device and the second electronic device support a set of users that share the user configuration information.

39. The method of claim 27, wherein the user is a member of a set of the plurality of supported users, wherein the set of supported users share the user configuration information.

40. The method of claim 27, wherein the user configuration information is updated at pre-determined periodic intervals.

41. A system for automatic configuration for receiving streaming media content by a first electronic device based on association with a second electronic device, the system comprising:
    computing devices comprising processing circuitry in communication with a centralized or distributed memory subsystem, and in communication via one or more networks with the first electronic device, wherein the computing devices are remote from the first electronic device and the second electronic device;
    wherein the processing circuitry is configured to:
        receive, via the one or more networks from the first electronic device, login information, compiled association information, and/or physical attributes of a user, the compiled association information comprising associations between the user and peripheral devices, resources, and/or communication interfaces,
        retrieve, from the centralized or distributed memory subsystem, user configuration information associated with the user and a second electronic device, the user configuration information comprising configuration or preferences for receiving streaming media content by the second electronic device,
        transmit, via the one or more networks to the first electronic device, at least a portion of the retrieved user configuration information, receipt of the user configuration information causing the first electronic device to configure a streaming media client application using the configuration or preferences for receiving streaming media content by the second electronic device, and
        control provisioning of a media content streaming service to the first electronic device based on the user configuration information.

42. The system of claim 41, wherein the processing circuitry is further configured to:
    update the user configuration information based on configuration or preferences for receiving streaming media content from the first electronic device; and
    transmit, via the one or more networks to the second electronic device, at least a portion of the updated user configuration information to the second electronic device, receipt of the updated user configuration information causing the second electronic device to configure a second streaming media client application using the configuration or preferences for receiving streaming media content by the first electronic device.

43. The system of claim 41, wherein the user configuration information is generated during access to the media content streaming service by the second electronic device at a time prior to receipt of the login information, compiled association information, and/or physical attributes of the user from the first electronic device.

44. The system of claim 41, wherein the centralized or distributed user configuration manager is provided on a server device, wherein the server device is in communication with the first electronic device and the second electronic device at least partially over a backbone network.

45. The system of claim 44, wherein the backbone network comprises a wired network and the backbone network is coupled to remote subnetworks.

46. The system of claim 41, wherein the second electronic device communicates with the user configuration manager using an access point for a local area wireless network, and the user configuration manager is provided on computing devices remote from the local area wireless network.

47. The system of claim 41, wherein the computing devices are configured to store a network access manager; and wherein the network access manager comprises executable logic that, when executed by the processing circuitry, causes the one or more of the computing devices to enable access to one or more of a cellular network and a wireless local area network for the updated user configuration information.

48. The system of claim 41, wherein the first electronic device and the second electronic device support a set of users that share the user configuration information.

49. The system of claim 41, wherein the computing devices are configured to control the provision of the media content streaming service to the first electronic device and the second electronic device based on connectivity related information corresponding to the first electronic device and the second electronic device.

50. The system of claim 41, wherein the login information, compiled association information, and/or physical attribute of the user are unique to the user.

\* \* \* \* \*